US012627897B2

(12) United States Patent
Huang et al.

(10) Patent No.: US 12,627,897 B2
(45) Date of Patent: May 12, 2026

(54) AUTOMATIC VIDEO RECORDING ALIGNMENT

(71) Applicant: TOSHIBA GLOBAL COMMERCE SOLUTIONS, INC., Durham, NC (US)

(72) Inventors: Yihsin Huang, Taipei City (TW); Wei-Yi Hsuan, Taipei City (TW); Wen-Fu Tsai, New Taipei City (TW); Yin-Chen Chou, New Taipei City (TW)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 1 day.

(21) Appl. No.: 18/631,872

(22) Filed: Apr. 10, 2024

(65) Prior Publication Data

US 2025/0324164 A1 Oct. 16, 2025

(51) Int. Cl.
*H04N 23/745* (2023.01)
*G06T 5/50* (2006.01)
*G06T 7/20* (2017.01)

(52) U.S. Cl.
CPC ............. *H04N 23/745* (2023.01); *G06T 5/50* (2013.01); *G06T 7/20* (2013.01); *G06T 2207/20221* (2013.01)

(58) Field of Classification Search
CPC ...... H04N 23/745; H04N 23/81; H04N 23/70; H04N 5/21; G06T 5/50; G06T 7/20; G06T 2207/20221; G06T 5/00
USPC ....................................... 348/226.1
See application file for complete search history.

(56) References Cited

U.S. PATENT DOCUMENTS

| | | | | |
|---|---|---|---|---|
| 11,146,857 B2 * | 10/2021 | Logan | ................ | H04N 21/4524 |
| 2014/0153839 A1 * | 6/2014 | Tsuzuki | ............... | H04N 23/741 |
| | | | | 382/254 |
| 2014/0300759 A1 * | 10/2014 | Lachapelle | .......... | H04N 23/745 |
| | | | | 348/207.1 |
| 2016/0255264 A1 * | 9/2016 | Russell | ................... | G06F 3/011 |
| | | | | 348/226.1 |
| 2018/0091860 A1 * | 3/2018 | Stokking | ............ | H04N 21/4728 |

(Continued)

OTHER PUBLICATIONS

Bhushan et al., https://www.stellarinfo.com/blog/how-to-re pair-missing-and-bad-frames-in-video/, How to Rebuild and Restore Master Database in SQL Server?, Jun. 25, 2024.

(Continued)

*Primary Examiner* — Albert H Cutler
(74) *Attorney, Agent, or Firm* — Patterson + Sheridan, LLP; Gero G. McClellan

(57) ABSTRACT

Methods and apparatus for dynamic video recording alignment are provided. A video alignment system receives a first signal indicating that an interaction device comprising a screen is in use. Responsive to the first signal, the system instructs the interaction device to record a series of images displayed on the screen. The system detects flicker in a video recording generated by a camera and depicting the screen, where the video recording comprises one or more defective frames contributing to the flicker. Upon detecting the flicker, the system retrieves one or more images, from the series of images, where the one or more images are recorded by the interaction device at moments of corresponding to the flicker. The system superimposes the one or more images onto the one or more defective frames in the video recording.

17 Claims, 7 Drawing Sheets

(56)                    References Cited

U.S. PATENT DOCUMENTS

2019/0139206 A1 *    5/2019  Derakhshani ......... H04N 23/74

OTHER PUBLICATIONS

HP, FreeSync Vs G-Sync, https://www.hp.com/us- en/shop/tech-takes/freesync-vs-gsync, dated Sep. 23, 2019.
Microsoft, Troubleshooting poor video playback, <https://support.microsoft.com/en-us/windows/troubleshooting-poor-video-playback-339d01fc-4d69-f720-1096-9d93bc5ea410>.
Harding, Scharon, What Is AMD Freesync? Three Tiers Explained, Tom's Hardware, Jun. 9, 2022, <https://www.tomshardware.com/reviews/amd-freesync-monitor-glossary-definition-explained,6009.html>.

* cited by examiner

400

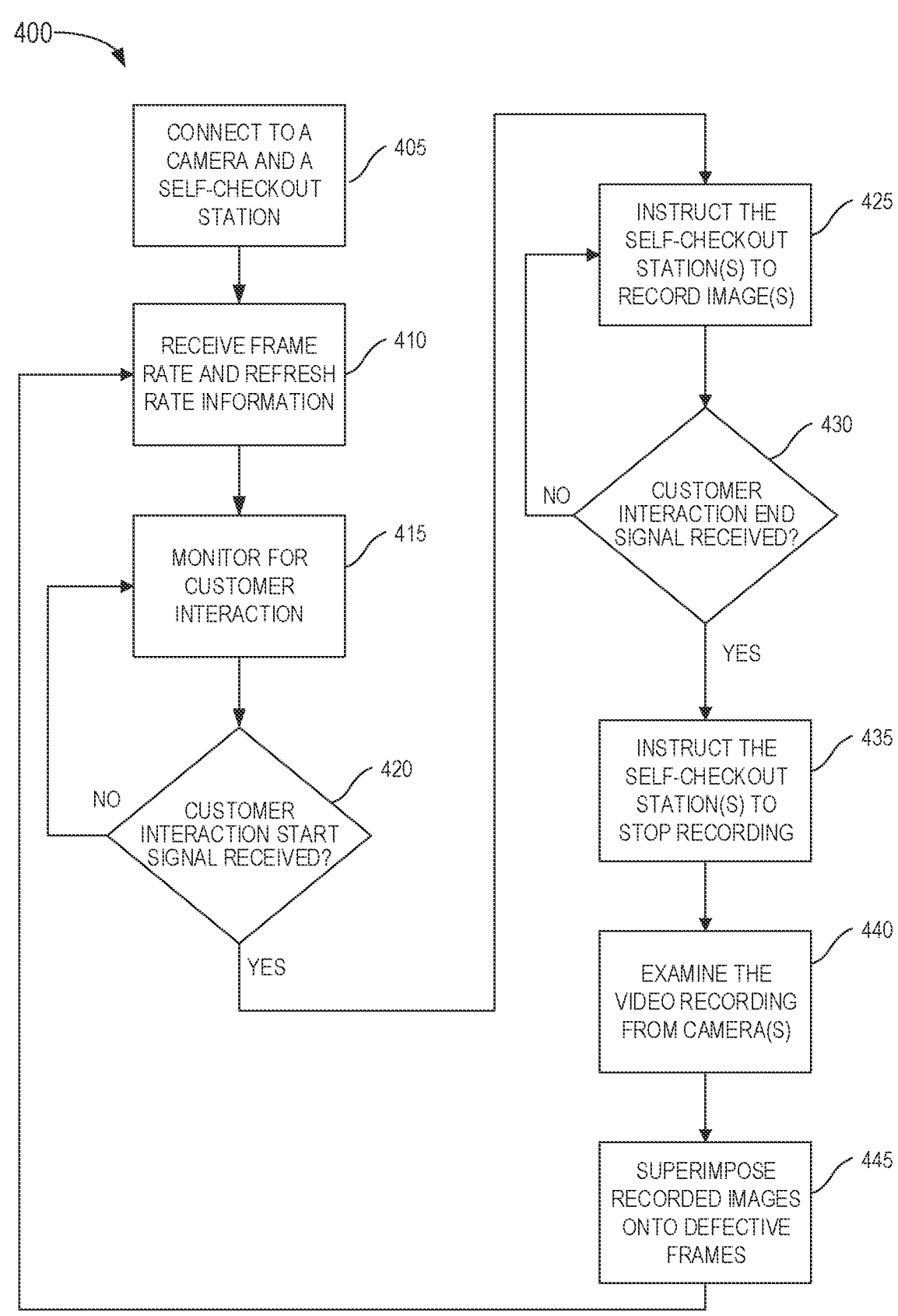

CONNECT TO A CAMERA AND A SELF-CHECKOUT STATION — 405

RECEIVE FRAME RATE AND REFRESH RATE INFORMATION — 410

MONITOR FOR CUSTOMER INTERACTION — 415

CUSTOMER INTERACTION START SIGNAL RECEIVED? — 420

NO

YES

INSTRUCT THE SELF-CHECKOUT STATION(S) TO RECORD IMAGE(S) — 425

CUSTOMER INTERACTION END SIGNAL RECEIVED? — 430

NO

YES

INSTRUCT THE SELF-CHECKOUT STATION(S) TO STOP RECORDING — 435

EXAMINE THE VIDEO RECORDING FROM CAMERA(S) — 440

SUPERIMPOSE RECORDED IMAGES ONTO DEFECTIVE FRAMES — 445

*FIG. 4*

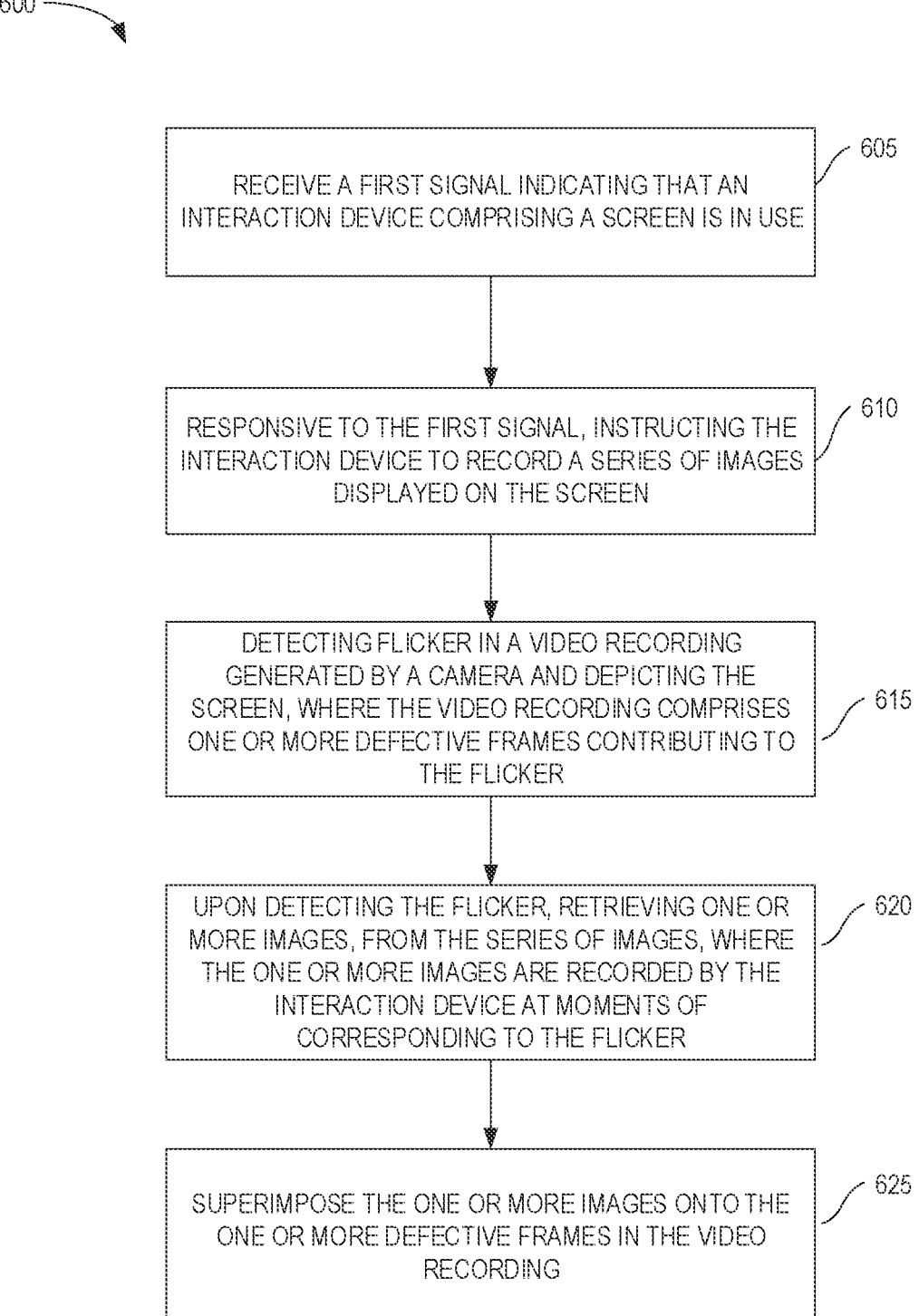

600

RECEIVE A FIRST SIGNAL INDICATING THAT AN INTERACTION DEVICE COMPRISING A SCREEN IS IN USE — 605

RESPONSIVE TO THE FIRST SIGNAL, INSTRUCTING THE INTERACTION DEVICE TO RECORD A SERIES OF IMAGES DISPLAYED ON THE SCREEN — 610

DETECTING FLICKER IN A VIDEO RECORDING GENERATED BY A CAMERA AND DEPICTING THE SCREEN, WHERE THE VIDEO RECORDING COMPRISES ONE OR MORE DEFECTIVE FRAMES CONTRIBUTING TO THE FLICKER — 615

UPON DETECTING THE FLICKER, RETRIEVING ONE OR MORE IMAGES, FROM THE SERIES OF IMAGES, WHERE THE ONE OR MORE IMAGES ARE RECORDED BY THE INTERACTION DEVICE AT MOMENTS OF CORRESPONDING TO THE FLICKER — 620

SUPERIMPOSE THE ONE OR MORE IMAGES ONTO THE ONE OR MORE DEFECTIVE FRAMES IN THE VIDEO RECORDING — 625

FIG. 6

AUTOMATIC VIDEO RECORDING ALIGNMENT

BACKGROUND

Understanding user behavior, preferences, and interactions with a variety of computing systems is useful for improving the computing systems themselves, as well as to help improve operational efficiency and enhancing the user's overall experience. One method to achieve this understanding is by analyzing video footage, which captures how users utilize the computing systems, including their navigation patterns, product or selection preferences, and challenges or difficulties they met during the interaction process. The effectiveness of the video analysis largely depends on the quality of the captured footage. High-quality video footage allows for more accurate observations and analyses of user behavior. However, discrepancies between the camera's frame rate and the computing system monitor's refresh rate can lead to issues such as flashing or flickering in the recorded footage. The resulting flicker or flashing may cause video quality distortion and obscure details of the interaction, making it challenging to conduct an accurate analysis of the video footage.

BRIEF DESCRIPTION OF THE DRAWINGS

FIG. 4 depicts an example method for the dynamic superimposition of recorded screen images onto flicker-affected frames of video recordings, according to some embodiments of the present disclosure.

FIG. 6 is a flow diagram depicting an example method for dynamic video recording alignment, according to some embodiments of the present disclosure.

DETAILED DESCRIPTION

Figure 1:
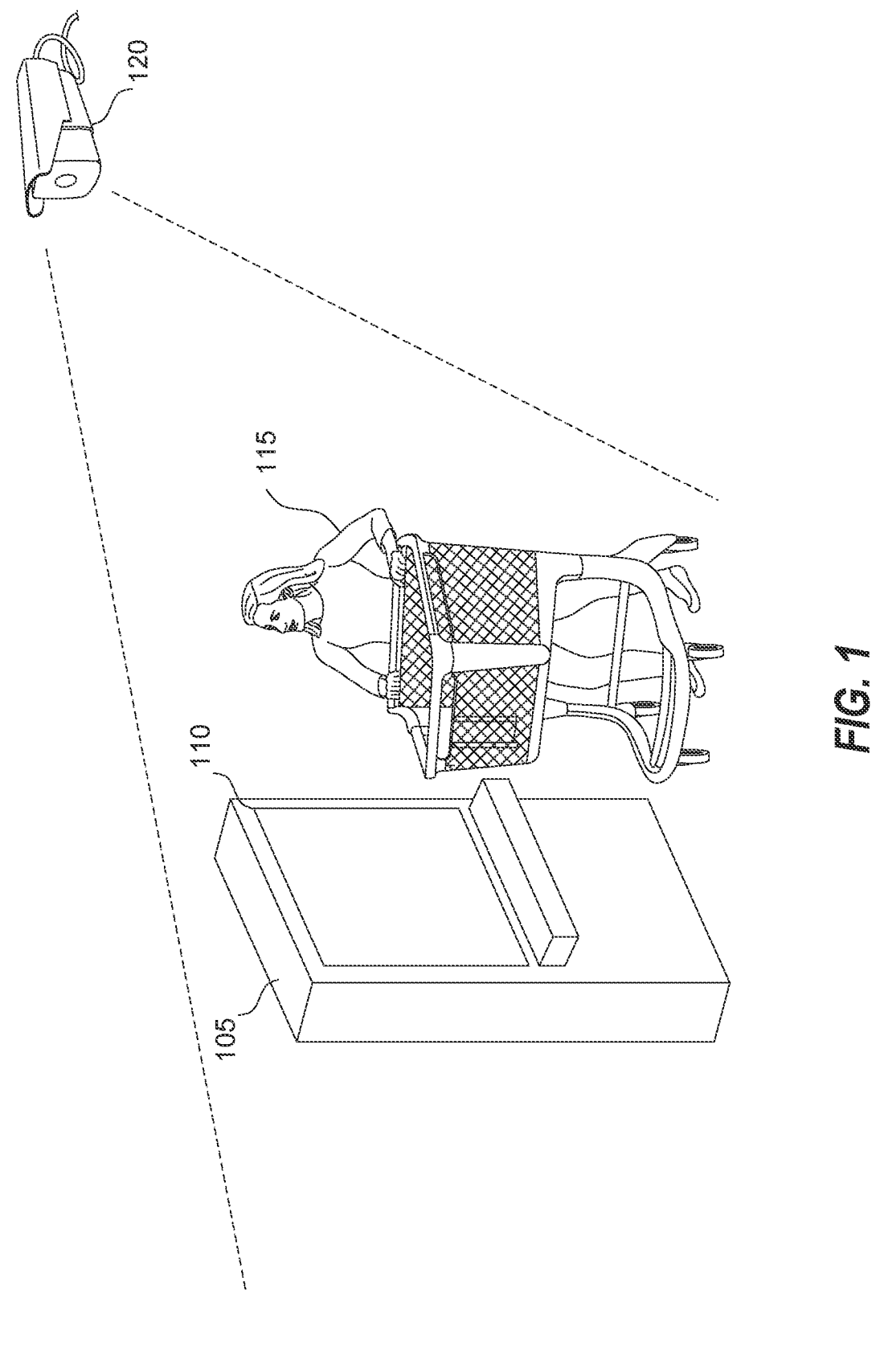
FIG. 1 depicts an example environment for monitoring user interactions with computing systems, according to some embodiments of the present disclosure.

In at least one example, the present disclosure relates to automatic video recording alignment. In some embodiments, the present disclosure provides a method and system that addresses flicker in video recordings caused by discrepancies between a monitor's refresh rate and a camera's frame rate.

An enterprise site (such as a retail store) usually has cameras installed around self-checkout areas to capture customers' behavior and interactions with self-checkout devices. A detailed analysis of this footage can provide various information, including customers' shopping preferences, the efficiency and/or effectiveness of the self-checkout system, and any challenges customers encounter during their interactions with the self-checkout devices. Furthermore, the analysis may reveal trends in customer behavior, such as peak usage periods for self-checkout devices, and/or preferences for interactive features on the devices. By utilizing the data, business owners may further optimize the self-checkout system, such as by adjusting the current menu layout or settings to better meet customer preferences, enhancing user-friendly features, replacing frequently used features for easier access, and introducing clearer on-screen instructions. These adjustments are configured to streamline the self-checkout process, enhance the store's overall operational efficiency, and/or improve the customer shopping experience. Although some aspects of the present disclosure discuss self-checkout systems in retail environments, aspects of the present disclosure are readily applicable to a wide variety of computing systems where users interact with graphical user interfaces (GUIs).

For effective data analysis, high-quality video recording (or footage) is often useful, such as for accurately capturing the content of the monitor or touchscreen interface of the self-checkout device that the customer is interacting with. However, a challenge arises due to the discrepancy between the frame rate of the video recording and the refresh rate of the monitor or touchscreen display. This discrepancy often results in flickering in the recorded video, which can severely impact the clarity and usability of the video for data analysis. The flickering makes it difficult to identify screen content that the customer is interacting with, and therefore compromises the system's capability to accurately analyze and interpret customer behavior.

The present disclosure introduces a video alignment system configured to mitigate the effects of flicker in video recordings. The system achieves this by automatically superimposing clear checkout images (e.g., screenshots), captured by interactives devices, over the monitor of the checkout system as depicted within frames affected by flicker (also referred to in some embodiments as defective frames). For example, to address these issues, the system may instruct an interaction device to record a series of images displayed on its screen during active customer interactions. Upon detecting flicker or flashing, which is caused by discrepancies between the screen's refresh rate and the camera's frame rate, the system may proceed to overlay the previously captured images to the monitor displayed in the flicker-affected frames of the video recording (where screen content is obscured). Such superimposition ensures continuous visibility of the screen's content in the video recording, therefore improving the quality of the video recording and facilitating accurate analysis of customer behavior and interactions.

FIG. 1 depicts an example environment 100 for monitoring user interactions with computing systems, according to some embodiments of the present disclosure. In the illustrated example environment 100, the computing system is a self-checkout station 105.

In the illustrated example environment 100, a customer 115 approaches the self-checkout station 105, and begins actively using the station 105 to perform transactions. The self-checkout station includes a screen 110, which displays all transaction details. A camera 120 is installed in proximity to the station, and configured to capture the customer 115's actions as well as the contents displayed on the screen. In some embodiments, the transactions performed on the self-checkout station 105 may range from purchasing goods to searching for product information. In some embodiments, self-checkout stations 105 may allow customers to scan items, weigh products, apply coupons, and complete payment transactions independently. In some embodiments, self-checkout stations 105 may provide access to store information, assist in locating products, and/or offer other services to enhance the customer shopping experience. Examples of self-checkout stations may include kiosks with integrated scanning and payment capabilities.

In some embodiments, the environment 100 may correspond to an enterprise site, such as a retail establishment (e.g., supermarkets, grocery stores, shopping malls). In some embodiments, the environment 100 may include more than one self-checkout station 105. In some embodiments, the self-checkout station 105 may be any interaction device (e.g., a computing device having a GUI for user interaction), which comprises a user-friendly interface 110 that enables customers 115 to engage directly with its system.

In some embodiments, screen 110 may include various features (or menu layouts) that a customer 115 can interface with during the transaction. In some embodiments, the screen 110 may have touch capability (e.g., touchscreen) so that the customer 115 can directly select options, input quantities, and navigate menus by touching the screen. In some embodiments, the screen 110 may refer to a standard monitor without touch capability. The customer may make selections and enter information using physical buttons or a keypad on the station.

In the illustrated example environment 100, camera 120 is installed near the self-checkout station 105 to capture the customer 115's interaction with the station 105. In some embodiments, the camera 120 may be either wall-mounted or ceiling mounted. In some embodiments, the camera 120 may be strategically positioned towards the station 105's direction, which enables the camera 120 to capture the customer's actions and/or the content displayed on the station's screen 110. Such placement may ensure a clear view of the transaction process, including the customer's selections, searched products, payment methods, and any interactions with the station's display interface 110. In some embodiments, the captured video recordings may be stored in a database (e.g., 335 of FIG. 3), and accessed on a computer (e.g., workstation 345 of FIG. 3) for review and analysis. In some embodiments, videos for different customers may be saved as separate recording files to facilitate effective data analysis.

In some embodiments, the discrepancy between the frame rate of the camera 120 and the refresh rate of the screen 110 may cause flickering or flashing in the video recording, which may obscure details of the customer's 115 interaction with the self-checkout station 105. To address this issue, in some embodiments, the camera 120 and the station 105 (which comprises the screen 110) may be connected to a central server (e.g., 330 of FIG. 3) designed for automatic video recording alignment.

In some embodiments, camera 120 may detect the customer's 115 approach to the self-checkout station 105 using motion detection techniques. Upon detection, the camera 120 may send a signal to the central server, indicating the start of a customer interaction. The server, upon receiving the start signal, may instruct the self-checkout station 105 (which is being captured by the reporting camera 120) to start recording a series of images displayed on its screen 110 during the interaction. The image recording may conclude upon receipt of an end signal from the camera 120, indicating the customer has completed their interaction and departed. Following the conclusion, the server may receive the video recording from camera 12, along with the series of images from self-checkout station 105, and store the received data in a database for further analysis. The server may review the video recording to detect any flicker or flashing, which is attributed to discrepancies between the refresh rate of the screen 110 and the frame rate of the camera 120. Upon detecting flicker that results in obscured screen content within the video frames, the server may retrieve the relevant images from the series captured by the self-checkout station 105. These images, which clearly display the content at moments of detected flicker, may then be used to augment the obscured or defective frames (e.g., by superimposing the clear images over the interactive device's screen, as displayed in the obscured frames) of the video recording. This techniques may ensure continuous visibility of the screen's content and enhance the quality of the video recording for detailed analysis of customer behavior and interactions.

In some embodiments, the detection of the start or end of a customer interaction may be determined directly by the self-checkout station 105 itself. For example, the initiation of an interaction may be recognized through actions that activate the device, such as a customer selecting an option on the touchscreen interface 110 of the station. In some embodiments, the conclusion of an interaction may be identified by the self-checkout station 105 where no inputs or actions are detected on the device for a predefined duration, suggesting that the customer has completed the transaction and departed. In some embodiments, the end of an interaction may be actively confirmed by the customer through an input or a selection. In such a configuration, the initiation and termination of recording images displayed on the station's screen 110 may be managed by the station itself, bypassing the requirement for directives from the central server. This allows a more direct and efficient method of capturing relevant display content throughout the interaction. Once the recording process is concluded, self-checkout station 105 may then transmit the compiled series of images to the server. The server, upon receiving these images, may proceed to analyze the images and store them in a database for further reference.

In some embodiments, camera 120 may record continuously, regardless of whether a customer starts or completes a transaction. In some embodiments, camera 120 may initiate recording with the start of a transaction and conclude upon its completion. The selective recording strategy may optimize storage and/or focus data analysis on periods of active customer engagement.

Figure 2:
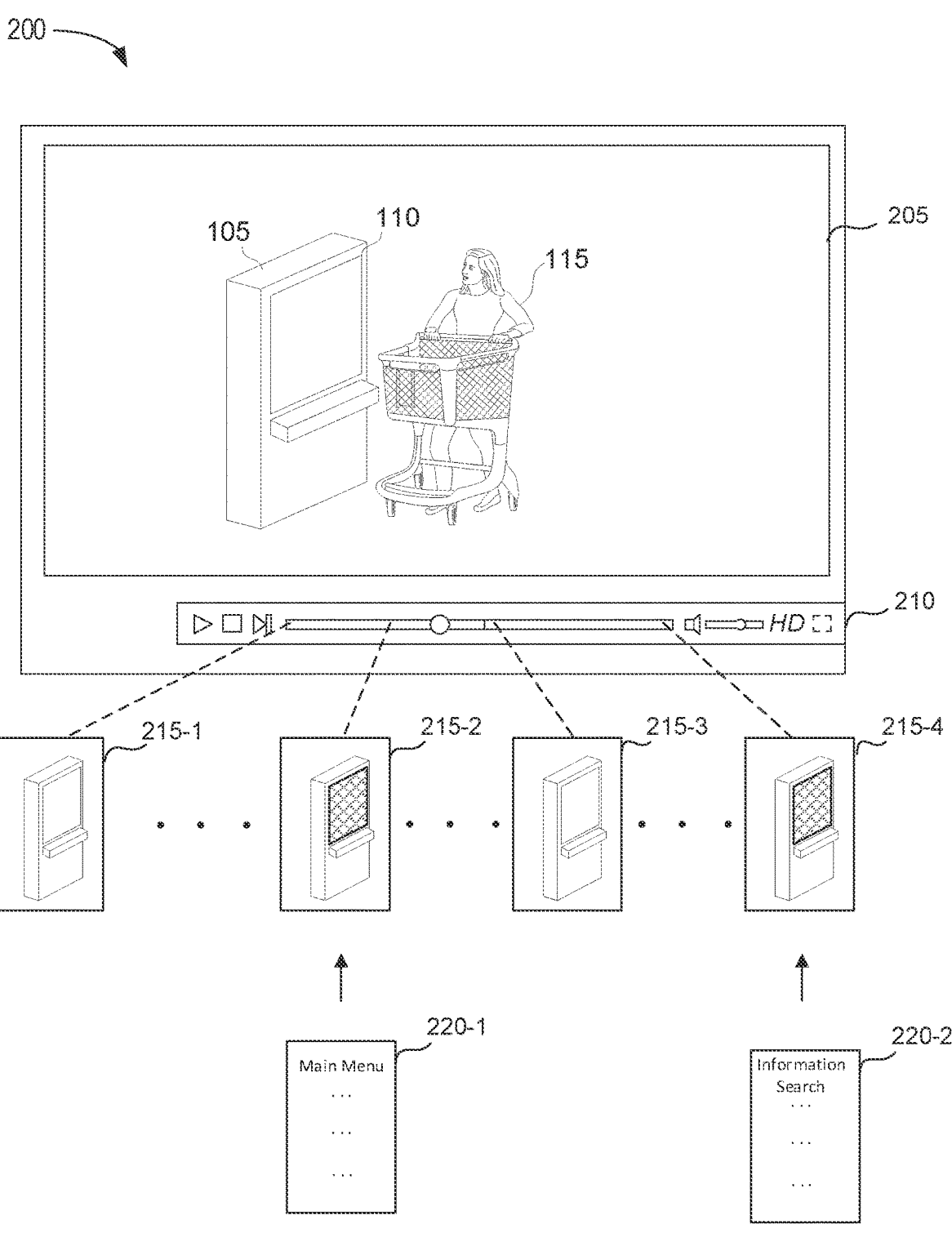
FIG. 2 depicts an example video player interface displaying video footage captured by in-store cameras, according to some embodiments of the present disclosure.

FIG. 2 depicts an example video player interface 200 displaying video footage captured by in-store cameras, according to some embodiments of the present disclosure.

The example video player interface 200 includes two main components: a view window 205 and a toolbar 210. As illustrated, the view window 205 is displaying a video recording captured by a camera (e.g., 120 of FIG. 1) installed at an enterprise site (e.g., a retail store). The toolbar 210 includes several control buttons for video playback, including the play button (to start or pause the video playback), the end video button (to stop the video), the next video button (to skip to the next video in the sequence for review), the progress bar (showing the video's timeline), the volume control button (to adjust the playback volume), the quality selector (to select the playback quality), and the fullscreen toggle (to switch to fullscreen mode for video playback).

Within the illustrated video player interface 200, the view window 205 is playing a video recording, which captures a customer 115 approaching a self-checkout station 105 and using it to complete various tasks. In some embodiments, the tasks may include checking out products, completing payments, accessing store maps, or searching for product or service information. As illustrated, the video records the customer 115's actions as well as the content displayed on the station's screen 110 (such as menu selection or information input by the customer).

In some embodiments, the video recording, which captures the customer 115's interaction with the self-checkout interface 110, may be utilized to analyze the customer's behavior and preferences. The analysis may then facilitate further optimization of the self-checkout system, therefore improving the store's overall operational efficiency. For example, by reviewing the video recordings, the data analysis system may identify the most frequently used features versus those that are less popular, and then determine whether the current menu layout or settings should be adjusted. In some embodiments, the recordings may reveal difficulties customers encounter while using the self-checkout system, such as unclear instructions or unresponsive touchscreen areas. Based on these findings, improvements may be implemented to further streamline the self-checkout process, such as introducing clear on-screen instructions, enhancing user-friendly features, or replacing frequently used options in the main menu for easier access. However, as discussed, the effectiveness of the analysis may heavily depend on the quality of the video recordings. When the refresh rate of the screen 110 and the frame rate of the video recording are different, such discrepancies may lead to flickering or flashing of the screen 110 within the video recording (displayed within the view window 205). As illustrated, the flickering or flashing leads to certain frames 215-2 and 215-4 in the video where the screen appears to be black, significantly reducing the clarity of the content displayed on the screen 110. The reduction in clarity makes it challenging for viewers to identify details of the interaction, such as the options selected by customer 115 or any challenges she met while using the system. Such visual disruptions impair the quality of the recorded video, making it more difficult to accurately and effectively analyze and interpret customer behavior.

To remove flickering or flashing of the screen 110 within the video recording, in some embodiments, a video alignment system may be implemented. The system may automatically superimpose clear images 220-1 and 220-2, recorded by self-checkout stations, over the screen 110 displayed in the flicker-affected frames 215-2 and 215-4 (also referred to in some embodiments as defective frames) of the video recording. This method ensures that the video recording (captured by the camera) remains clear and useful for subsequent data analysis. In some embodiments, upon detecting the initiation of customer interaction (either through its own mechanism by recognizing a customer's action to activate the station, or by receiving a signal from the camera or server indicating the customer's approach to the station), the self-checkout station 105 may begin recording images displayed on its screen 110. The recording process may continue until the end of the customer interaction is detected. The resulting series of images may then be saved in a database for future reference. When the video alignment system detects flicker in the video recording and identifies the relevant affected frames 215-2 and 215-4, it may retrieve the corresponding images from the series that were recorded by the station 105 during the interaction. By superimposing these images 220-1 and 220-2 over the screen 110 displayed in the flicker-affected frames 215-2 and 215-2, the system may maintain the continuity and clarity of the screen's content throughout the video recording.

Figure 3:
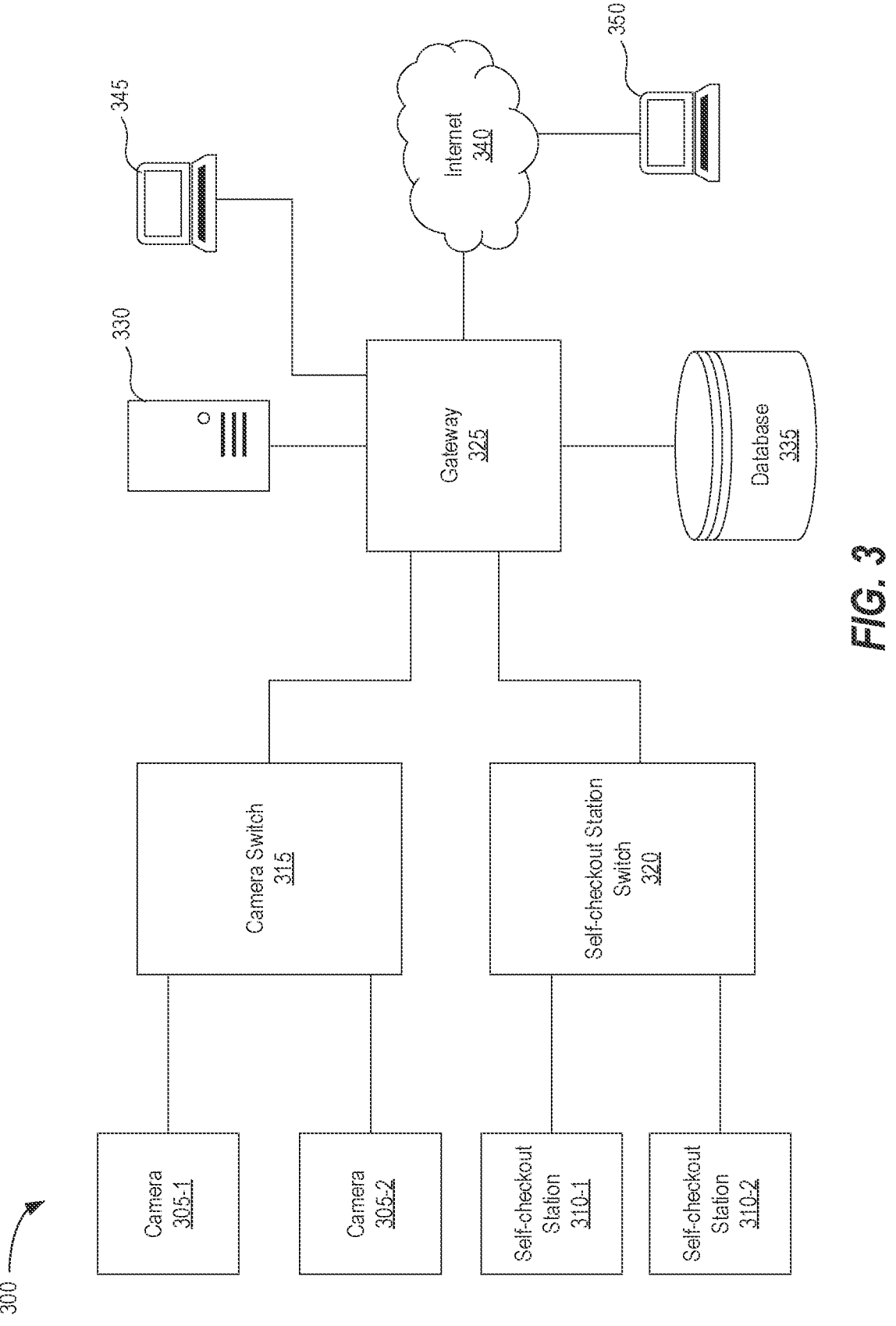
FIG. 3 depicts an example video alignment system, according to some embodiments of the present disclosure.

FIG. 3 depicts an example video alignment system 300, according to some embodiments of the present disclosure.

FIG. 3 illustrates the network architecture of the example video alignment system 300 within an enterprise site (e.g., a retail store). As illustrated, the video alignment system 300 includes two cameras 305-1 and 305-2, each connected to a camera switch 315, and two self-checkout stations 310-1 and 310-2, each connected to a self-checkout station switch 320.

In some embodiments, the cameras 305-1 and 305-2 may correspond to the camera 120 as depicted in FIG. 1. In some embodiments, the self-checkout stations 310-1 and 310-2 may correspond to the self-checkout station 105 as depicted in FIG. 1. The cameras 305 may be installed in proximity to the self-checkout stations 310 within the site, and configured to capture views of how customers interact with and utilize these devices. For example, camera 305-1 may be directed towards the self-checkout station 310-1, capturing customer interactions and/or transactions at the station 310-1. Camera 305-2 may be installed towards the self-checkout station 310-2, and record customer interactions and/or transactions at the station 310-2.

Each camera 305 may have a frame rate. As used herein, the frame rate may refer to frames per second (fps), which indicates how many individual images (or frames) the camera captures in one second of video. Cameras typically support various frame rates, such as 24 fps, 30 fps, or 60 fps, among others. The selected frame rate may be adjusted based on the requirements of the monitoring task. In some embodiments, higher frame rates may be used in areas that are busy with large numbers of customer activities to capture more details, while lower frame rates may be used in less busy areas. In some embodiments, the frame rate may be increased to generate smoother videos for detailed analysis. In some embodiments, the frame rate may be reduced to save storage space.

Each self-checkout station 310 may include a screen (e.g., 110 of FIG. 1) that has a refresh rate. As used herein, the refresh rate may refer to the number of times per second (measured in Hertz (Hz)) that the screen updates its display. Typically refresh rates for screens may include 60 Hz, 120 Hz, 144 Hz, and even 240 Hz. A higher refresh rate can make motions on the screen appear smoother and reduce motion blur.

As illustrated, the two cameras 305 are connected to the camera switch 315, and the two self-checkout stations 310 are connected to the self-checkout station switch 320. The camera switch 315 and the self-checkout station switch 320 are then connected to other parts of the network through the gateway 325, including, but not limited to, a server 330, a local workstation 345, and a database 335. In some embodiments, the gateway 325 may possess both router and modem capabilities, and serve as the central hub for internal and external data transmission. In some embodiments, the camera switch 315 may be configured to aggregate video recording data from multiple cameras, such as 305-1 and 305-2, and/or distribute the data across the network. For example, in some embodiments, the camera switch 315 may send the video data to the server 330, where the data is further processed or stored in the database 335. In some embodiments, the camera switch 315 may send the video data to the local workstation 345, where security personnel can conduct real-time monitoring. In some embodiments, each self-checkout station, such as 310-1 and 310-2, may capture a series of images of their screen during active customer interaction. The self-checkout station switch 320 may then aggregate the image data from multiple self-checkout stations, and/or distribute it to the server 330 for further analysis and storage. In some embodiments, the connections between various components within the video alignment system (such as the connections between the cameras 305 and the camera switch 315, or the self-checkout stations 310 and the self-checkout station switch 320) may be either wired or wireless, depending on the requirements, constraints, and capabilities of the network infrastructure.

As illustrated, the gateway 325 further provides connectivity to the Internet 340. A remote workstation 350, connected via the internet 340, may access the video alignment system, and conduct off-site video viewing and/or data analysis.

In some embodiments, the cameras 305 may report their frame rates to the server 330 through the network connections. In some embodiments, the reporting may occur periodically (e.g., every hour) or triggered by certain events (such as when the frame rate changes). In some embodiments, the self-checkout station 310 may transmit their screen refresh rate to the server 330 through the network connections. In some embodiments, the reporting may occur periodically (e.g., every hour) or triggered by certain events (such as when the screen refresh rate changes). In some embodiments, the server 330 may compare the refresh rate of the screen from each self-checkout station 310 with the frame rate reported by its corresponding camera 305. The comparison allows the server 330 to anticipate flickering or flashing in the video recording generated by the camera when a discrepancy between the refresh rate and the frame rate is detected. By identifying these discrepancies for each station-camera pair, the server may implement measures to mitigate visual disruptions in the recorded footage, which may include replacing frames in the video where the screen content is obscured due to flicker, with clear images captured by the self-checkout station 310 during the interaction.

The illustrated example video alignment system 300, including two cameras 305 and two self-checkout stations 310, is depicted for conceptual clarity. In some embodiments, any number of cameras and/or self-checkout stations (including one) on the site may be integrated into the video alignment system to accommodate the operational requirements of the enterprise.

Although a central server 330 is depicted within the video alignment system 300, in some embodiments, the system 300 may include more than one server, with the functionality of comparing refresh rate and frame rate, identifying flicker in video footage, and replacing obscured frames with clear images being distributed across these servers. The distributed server architecture may share the computation load across multiple servers, thereby improving the system's scalability and reliability.

Figure 7:
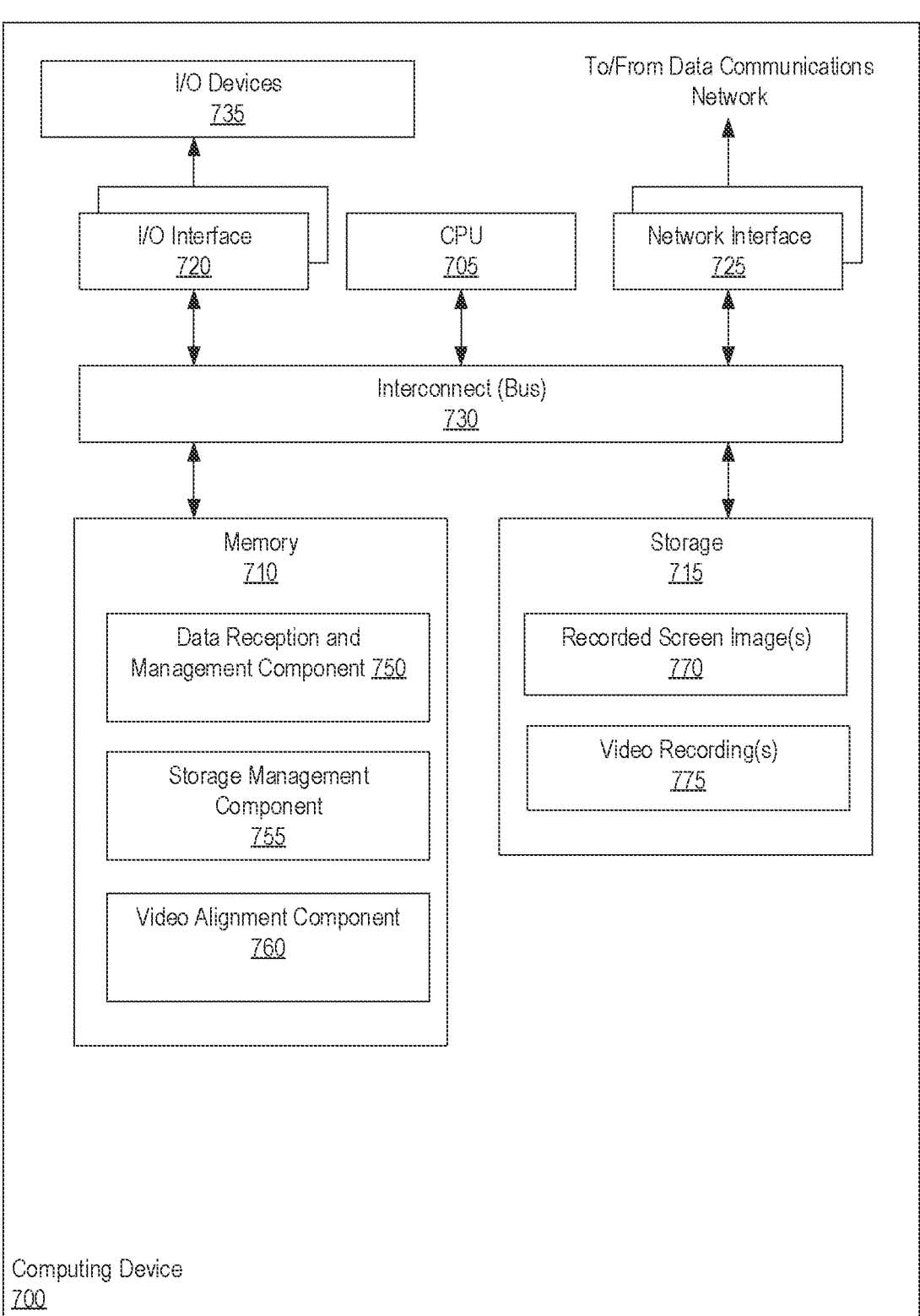
FIG. 7 depicts an example computing device configured to perform various aspects of the present disclosure, according to some embodiments of the present disclosure.

FIG. 4 depicts an example method 400 for the dynamic superimposition of recorded screen images onto flicker-affected frames of video recordings, according to some embodiments of the present disclosure. In some embodiments, the method 400 may be performed by one or more computing devices, such as the server 330, the local workstation 345, or the remote workstation 350 as illustrated in FIG. 3, and/or the computing device 700 as illustrated in FIG. 7.

The method 400 begins at block 405, where a video alignment server (e.g., 330 of FIG. 3) establishes connections with cameras (e.g., 305 of FIG. 3) and self-checkout stations (e.g., 310 of FIG. 3) within an enterprise site (e.g., a retail store). The connections may be either wired or wireless, depending on the setup and requirements of the enterprise site. In some embodiments, the server may identify each camera or self-checkout station by its unique identifier (e.g., IP address). In some embodiments, the server may implement security and authentication procedures to protect against unauthorized access or tampering, such as verifying the identity of each device using exchanged security keys or certificates, or encrypting the data exchanged.

At block 410, the video alignment server receives frame rate information from each connected camera (e.g., 305 of FIG. 3), as well as screen refresh rate information from each connected self-checkout station (e.g., 310 of FIG. 3). In some embodiments, the frame rate information may include the current frame rate at which the camera is recording video. In some embodiments, the refresh rate information details the current operating refresh rate of each self-checkout station's screen. In some embodiments, the reporting of both frame rate and refresh rate may be periodic, following predefined rules for these updates at set intervals, such as every hour, every 12 hours, or daily. Alternatively, in other embodiments, the reporting may be event-triggered, with both cameras and self-checkout stations reporting changes immediately following any adjustments or events that alter their settings. Upon receiving the data, the server may process and/or store the data for each camera and self-checkout station in a database (e.g., 335 of FIG. 3). The server may periodically compare the refresh rate and frame rate for each station-camera pair or do so upon changes in these rates. The detected discrepancies may serve as alerts to the server, indicating the potential for flicker in the video recording received from the camera. These alerts may prompt the server to undertake a more detailed examination of the video footage, assessing the extent of flicker or flashing and determining the steps to address these visual disruptions.

At block 415, the video alignment server monitors signals indicating the start of customer interactions at self-checkout stations. In some embodiments, the cameras installed within the enterprise site may be designed with motion detection capabilities. When a customer (e.g., 115 of FIG. 1) approaches a self-checkout station (e.g., 105 of FIG. 1), the motion detection algorithm within the camera (e.g., 120 of FIG. 1) identifies the movement. Following the identification, the camera generates a signal and transmits it to the video alignment server, indicating the start of a customer interaction with the station.

Additionally, in other embodiments, the self-checkout stations themselves may serve as direct sources of interaction signals. For example, actions to activate a self-checkout station, such as scanning a product or selecting an option on the touchscreen, may be recognized by a station as the start of a customer interaction. In such configurations, instead of sending a notification signal to the server, the station itself may automatically initiate the recording of images displayed on its screen, effectively bypassing the step to alert the server.

At block 420, the video alignment server determines whether a signal indicating the start of a customer interaction is received. If the signal is received, the method 400 proceeds to block 425. If no such signal is received, the method 400 returns to block 425 for continuous monitoring.

At block 425, upon determining a self-checkout station is involved in the customer interaction, the server sends a command to the station, guiding it to start recording the images displayed on its screens. The recording instruction ensures that all relevant visual information, from product selections to payment conformations displayed on the station's screen, is documented through these images.

In embodiments where start signals are received from multiple cameras (e.g., 305-1 and 305-2 of FIG. 3) (or multiple self-checkout stations), the server may first analyze each signal to determine which station (e.g., 310-1 and 310-2 of FIG. 3) and the corresponding camera are involved.

In some embodiments, the analysis may be developed based on the known configurations and locations of cameras relative to the stations they monitor. The server may maintain a mapping of cameras to corresponding self-checkout stations to facilitate the identification process. Upon identifying a self-checkout station that is actively involved in a customer interaction, the server may send an instruction directly to the station, prompting it to begin recording the images displayed on its screen during the interaction.

At block 430, the video alignment server checks for signals indicating the end of customer interactions at self-checkout stations. In some embodiments, the end signal may originate from a camera, which utilizes its motion detection capabilities to determine that a customer has left the vicinity of a self-checkout station. This can be determined by a period of no movement detected in the area being monitored, indicating that the transaction or interaction has concluded and the customer has moved away.

Alternatively, in other embodiments, the end signal may be directly from the self-checkout stations. For example, if a station detects that no inputs or actions have been recorded within a predetermined period of time, it may automatically conclude that the customer interaction has been completed. In some embodiments, the self-checkout station may prompt the customer with a question or option to confirm whether she has finished her transaction or has any other inquiries. If the customer confirms completion or if there is no response within a defined period of time, the station recognizes that the interaction has ended, and sends a signal to the server. In such configurations, the station itself may automatically conclude the recording of images, without the step of sending an end signal to the server.

If no end signal is received, the method 400 returns to block 425, where the server maintains the current operation state, monitoring whether the self-checkout station continues to record the images displayed on its screen. If the end signal is received, indicating a customer has completed the interaction with a self-checkout station, the method 400 proceeds to block 435, where the server sends a control signal to the station, instructing it to cease the recording of images. In embodiments where multiple self-checkout stations are involved in customer interactions concurrently, upon receiving an end signal, the server may identify the station of interest, and send a control signal to the identified station, directing it to stop the image recording process.

At block 440, the server examines the received video recording from the camera to determine the presence of flicker or flashing. If such flicker or flashing is detected, the server may identify the frames (e.g., 215-2 and 215-4) within the video that are affected (or defective).

At block 445, the server retrieves the images that were recorded by the self-checkout station at the moments of the detected flicker. These images (e.g., 220-1 and 220-2) accurately reflect the content displayed on the screen when the video frames were compromised. Subsequently, the server superimposes these clear images over the screen displayed in the affected frames of the video recording. This process ensures that the final video accurately represents the customer interaction without the visual impairments caused by flicker.

Figure 5:
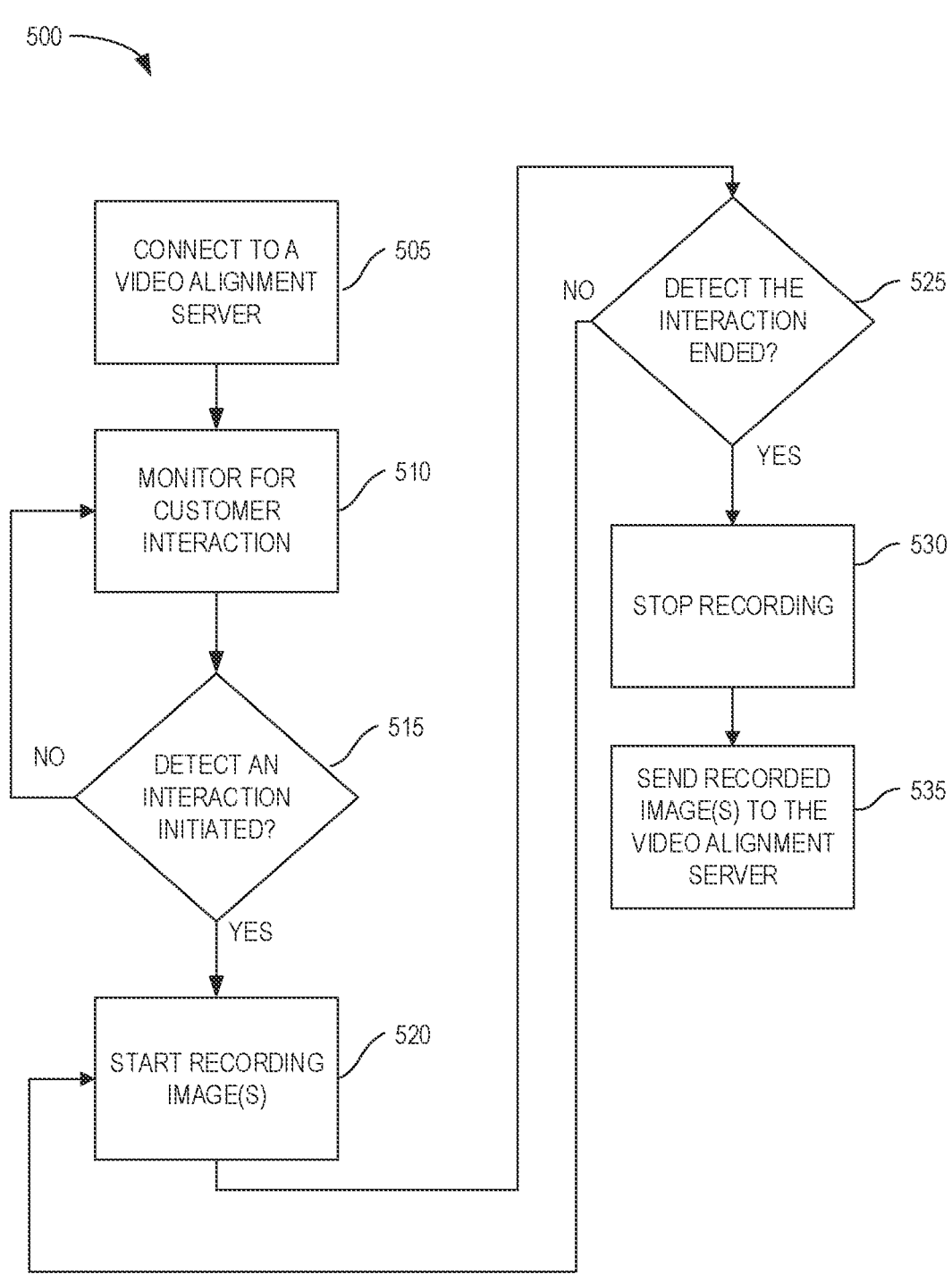
FIG. 5 depicts an example method for dynamic user interaction detection and screen image recording, according to some embodiments of the present disclosure.

FIG. 5 depicts an example method 500 for dynamic user interaction detection and screen image recording, according to some embodiments of the present disclosure. In some embodiments, the method 500 may be performed by the self-checkout station 105 as illustrated in FIG. 1, and/or the self-checkout station 310 as illustrated in FIG. 3.

At block 505, a self-checkout station (e.g., 120 of FIG. 1) connects to a video alignment server (e.g., the server 330 of FIG. 3).

At block 510, the self-checkout station monitors for any customer activities that indicate the start of an interaction. In some embodiments, the activities may include actions that activate the station, such as scanning a product, or selecting an option on the touchscreen (e.g., 110 of FIG. 1) of the station.

At block 515, the self-checkout station detects whether an interaction is initiated by a customer (or a user) (e.g., 115 of FIG. 1). If an interaction is detected, such as scanning a product or selecting an option on the touchscreen, the method 500 proceeds to block 520, where the self-checkout station initiates the recording of images displayed on its screen. If no interaction is detected, indicating the station remains inactive (that no action is being taken at the station), the method 500 returns to block 510, where the self-checkout station continues monitoring for customer interactions.

At block 525, the self-checkout station monitors for indications that the customer interaction has ended. In some embodiments, the indications may include a period of inactivity or unresponsiveness, which suggests that the customer is no longer engaging with the station. In some embodiments, the indications may include the customer's active confirmation of the completion of her transaction, such as selecting the "Finish" or "Completed" option on the touchscreen. If the station determines that the interaction has ended, the method 500 proceeds to block 530, where the station stops the recording of images displayed on its screen. If the station determines that the interaction is still in progress, the method 500 returns to block 520, where the station continues the recording of screen images to capture the entirety of the customer interaction without interruption.

At block 535, following the conclusion of recording, the self-checkout station transmits the recorded series of images to the video alignment server. The server may save the received image into a database (e.g., 335 of FIG. 3). Upon detecting flicker in the video recording, the server may retrieve the relevant images corresponding to the moments of detected flicker. These images may then be used for superimposition over the screen shown in the flicker-affected frames of the video recording.

FIG. 6 is a flow diagram depicting an example method 600 for dynamic video recording alignment, according to some embodiments of the present disclosure.

At block 605, a computing device (e.g., video alignment server 330 of FIG. 3) receives a first signal indicating that an interaction device (e.g., self-checkout station 105 of FIG. 1, or self-checkout station 310-1 of FIG. 3) comprising a screen (e.g., 110 of FIG. 1) is in use (as depicted by block 420 of FIG. 4). In some embodiments, the interaction device may comprise at least one of a self-checkout station or an interactive kiosk.

At block 610, responsive to the first signal, the computing device instructs the interaction device to record a series of images displayed on the screen (as depicted by block 425 of FIG. 4).

At block 620, the computing device detects flicker in a video recording generated by a camera (e.g., camera 120 of FIG. 1, or camera 305-1 of FIG. 3) and depicting the screen, where the video recording comprises one or more defective frames (e.g., 215-1 and 215-4 of FIG. 2) contributing to the flicker (as depicted by block 440 of FIG. 4). In some embodiments, the flicker may result in the one or more images displayed on the screen not visible in the video recording. In some embodiments, the flicker may be caused by a discrepancy between a refresh rate of the screen and a frame rate of the camera.

At block 625, upon detecting the flicker, the computing device retrieves one or more images (e.g., 220-1 and 220-2 of FIG. 2), from the series of images, where the one or more images are recorded by the interaction device at moments of corresponding to the flicker.

At block 630, the computing device superimposes the one or more images onto the one or more defective frames in the video recording (as depicted by block 445 of FIG. 4).

In some embodiments, the computing device may further receive a second signal indicating an end of use of the interaction device (as depicted by block 430 of FIG. 4), and responsive to the second signal, the computing device may instruct the interaction device to stop recording the series of images displayed on the screen (as depicted by block 435 of FIG. 4). In some embodiments, the first and second signals may be generated based on motion detection by the camera.

In some embodiments, the computing device may further receive a refresh rate of the screen from the interaction device and receive a frame rate from the camera. The computing device may compare the refresh rate and the frame rate within a defined time interval. Upon detecting that the refresh rate is different from the frame rate, the computing device may initiate a flicker examination on the video recording received from the camera.

FIG. 7 depicts an example computing device 700 configured to perform various aspects of the present disclosure, according to some embodiments of the present disclosure. Although depicted as a physical device, in some embodiments, the computing device 700 may be implemented using virtual device(s), and/or across a number of devices (e.g., in a cloud environment). The computing device 700 can be embodied as any computing device or system, such as the server 330, the local workstation 345, or the remote workstation 350 as illustrated in FIG. 3.

As illustrated, the computing device 700 includes a CPU 705, memory 710, storage 715, one or more network interfaces 725, and one or more I/O interfaces 720. In the illustrated embodiment, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally considered to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) are connected via the I/O interface(s) 720. Further, via the network interface 725, the computing device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated embodiment, the memory 710 includes a data reception and management component 750, a storage management component 755, and a video alignment component 760. Although depicted as a discrete component for conceptual clarity, in some embodiments, the operations of the depicted component (and others not illustrated) may be combined or distributed across any number of components. Further, although depicted as software residing in memory 710, in some embodiments, the operations of the depicted components (and others not illustrated) may be implemented using hardware, software, or a combination of hardware and software.

In the illustrated embodiment, the data reception and management component 750 may receive various types of data, including start/end signals of customer interactions at self-checkout stations (indicating the beginning and conclusion of transactions), video recordings generated by cameras, and recorded screen images by self-checkout stations. The data reception and management component 750 may parse through the received data, and/or perform an initial validation to ensure that the date originates from trusted sources and is correctly formatted. Once data is received and validated, the storage management component 755 may manage the storage of information, such as the video recordings and the captured screen images, to ensure that the data is organized and stored for easy retrieval and analysis. The video alignment component 760 may examine the video recordings generated by the cameras to determine the presence of flicker or flashing, which may result from discrepancies between the camera frame rates and the screen refresh rates of their corresponding stations. Upon detecting flicker, the component 760 may identify the affected frames within the recording. The component 760 may then retrieve the corresponding images that were captured by the self-checkout stations at the moments of detected flicker, and superimposes these clear images over the screen shown in the defective frames of the video recording. Through the process of superimposition, the video alignment component 760 may generate a clear and continuous video recording that provides an uninterrupted view of the screen content. The video recording may then be used for further data analysis of customer behavior and optimization of the checkout system.

In the illustrated example, the storage 715 may include video recordings or footage 780 captured by cameras and screen images 785 recorded by self-checkout stations. In some embodiments, the aforementioned data may be saved in a remote database (e.g., 335 of FIG. 3) that connects to the computing device 700 via a network.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a given advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a given manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., video recording alignment application) or related data available in the cloud. For example, the video recording alignment application may perform data processing and generate corresponding instructions through a cloud computing infrastructure, and store the relevant results in a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method comprising:
receiving a first signal indicating that an interaction device comprising a screen is in use;
responsive to the first signal, instructing the interaction device to record a series of images displayed on the screen;
detecting flicker in a video recording generated by a camera and depicting the screen, wherein the video recording comprises one or more defective frames contributing to the flicker;
upon detecting the flicker, retrieving one or more images, from the series of images, wherein the one or more images are recorded by the interaction device at moments of corresponding to the flicker;
receiving a second signal indicating an end of use of the interaction device;
responsive to the second signal, instructing the interaction device to stop recording the series of images displayed on the screen; and
superimposing the one or more images onto the one or more defective frames in the video recording.

2. The method of claim 1, wherein the flicker results in the one or more images displayed on the screen not visible in the video recording.

3. The method of claim 1, wherein the flicker is caused by a discrepancy between a refresh rate of the screen and a frame rate of the camera.

4. The method of claim 1, wherein the interaction device comprises at least one of a self-checkout station or an interactive kiosk.

5. The method of claim 1, further comprising:
receiving a refresh rate of the screen from the interaction device;
receiving a frame rate from the camera;
comparing the refresh rate and the frame rate within a defined time interval; and
upon detecting that the refresh rate is different from the frame rate, initiating a flicker examination on the video recording received from the camera.

6. The method of claim 1, wherein the first and second signals are generated based on motion detection by the camera.

7. A system, comprising:
one or more processors;
one or more memories storing a program, which, when executed on any combination of the one or more processors, performs operations, the operations comprising:
receiving a first signal indicating that an interaction device comprising a screen is in use;
responsive to the first signal, instructing the interaction device to record a series of images displayed on the screen;
detecting flicker in a video recording generated by a camera and depicting the screen, wherein the video recording comprises one or more defective frames contributing to the flicker;
upon detecting the flicker, retrieving one or more images, from the series of images, wherein the one or more images are recorded by the interaction device at moments of corresponding to the flicker;
receiving a second signal indicating an end of use of the interaction device;
responsive to the second signal, instructing the interaction device to stop recording the series of images displayed on the screen; and
superimposing the one or more images onto the one or more defective frames in the video recording.

8. The system of claim 7, wherein the flicker results in the one or more images displayed on the screen not visible in the video recording.

9. The system of claim 7, wherein the flicker is caused by a discrepancy between a refresh rate of the screen and a frame rate of the camera.

10. The system of claim 7, wherein the interaction device comprises at least one of a self-checkout station or an interactive kiosk.

11. The system of claim 7, wherein the program, which, when executed on any combination of the one or more processors, performs the operations further comprising:
receiving a refresh rate of the screen from the interaction device;
receiving a frame rate from the camera;
comparing the refresh rate and the frame rate within a defined time interval; and
upon detecting that the refresh rate is different from the frame rate, initiating a flicker examination on the video recording received from the camera.

12. The system of claim 7, wherein the first and second signals are generated based on motion detection by the camera.

13. One or more non-transitory computer-readable media containing, in any combination, computer program code that, when executed by operation of a computer system, performs operations comprising:

receiving a first signal indicating that an interaction device comprising a screen is in use;

responsive to the first signal, instructing the interaction device to record a series of images displayed on the screen;

detecting flicker in a video recording generated by a camera and depicting the screen, wherein the video recording comprises one or more defective frames contributing to the flicker;

upon detecting the flicker, retrieving one or more images, from the series of images, wherein the one or more images are recorded by the interaction device at moments of corresponding to the flicker;

receiving a second signal indicating an end of use of the interaction device;

responsive to the second signal, instructing the interaction device to stop recording the series of images displayed on the screen; and superimposing the one or more images onto the one or more defective frames in the video recording.

14. The one or more non-transitory computer-readable media of claim 13, wherein the flicker results in the one or more images displayed on the screen not visible in the video recording.

15. The one or more non-transitory computer-readable media of claim 13, wherein the flicker is caused by a discrepancy between a refresh rate of the screen and a frame rate of the camera.

16. The one or more non-transitory computer-readable media of claim 13, wherein the interaction device comprises at least one of a self-checkout station or an interactive kiosk.

17. The one or more non-transitory computer-readable media of claim 13, wherein the first and second signals are generated based on motion detection by the camera.

* * * * *